April 27, 1965
D. D. HUNDLEY
3,180,138
TRACTOR TESTER
Filed May 10, 1962
4 Sheets-Sheet 1
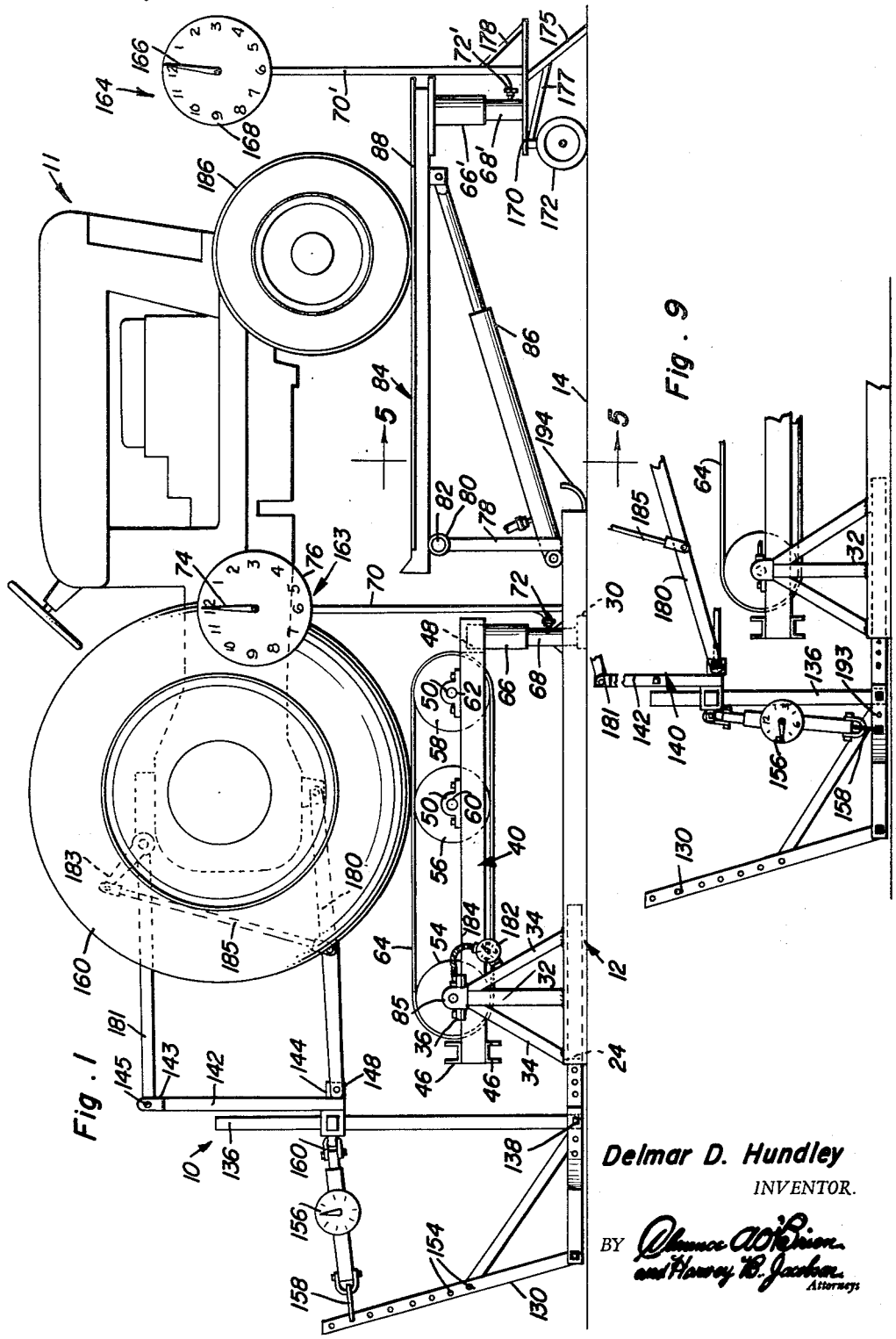
Delmar D. Hundley
INVENTOR.

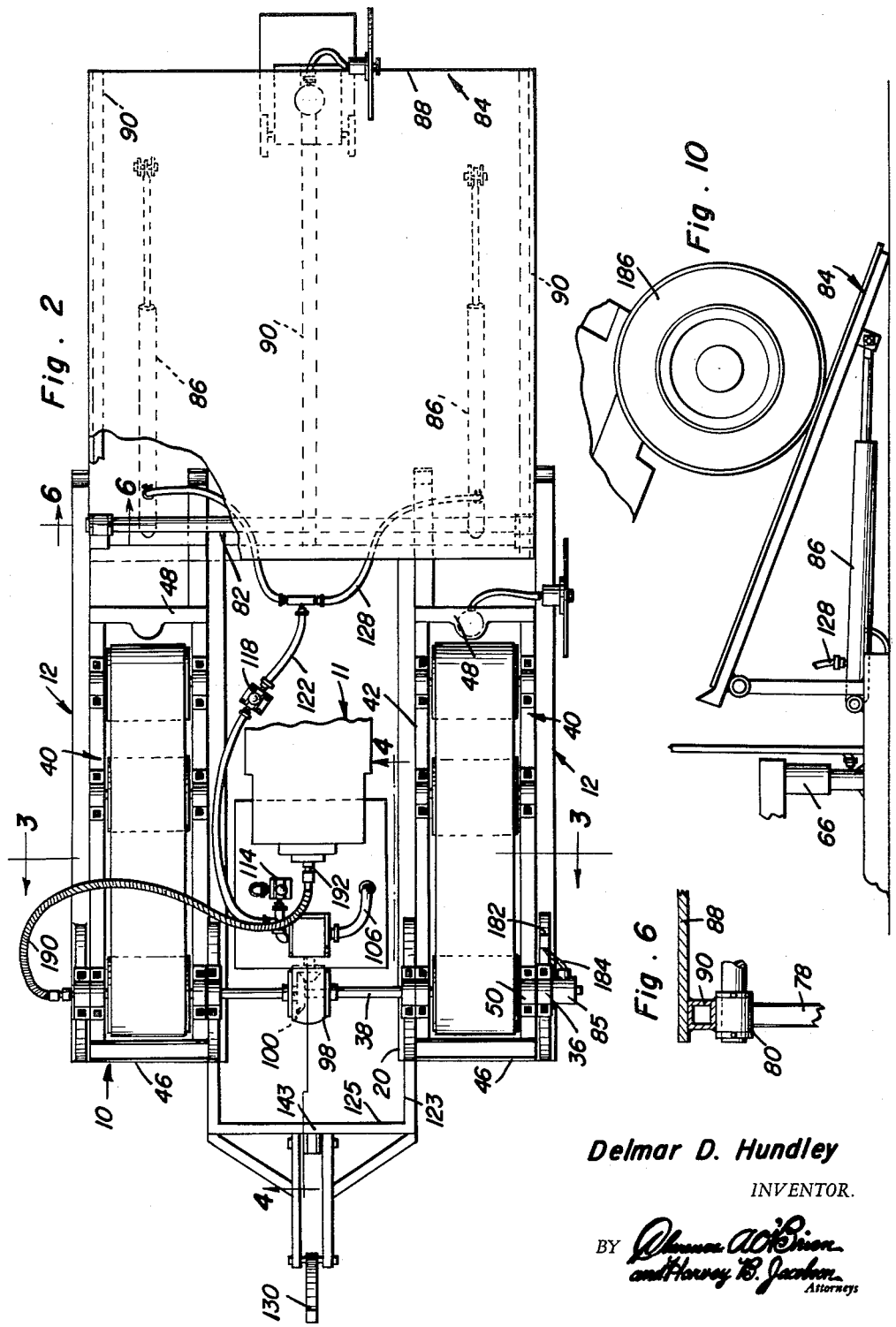

April 27, 1965
D. D. HUNDLEY
3,180,138
TRACTOR TESTER
Filed May 10, 1962
4 Sheets-Sheet 3
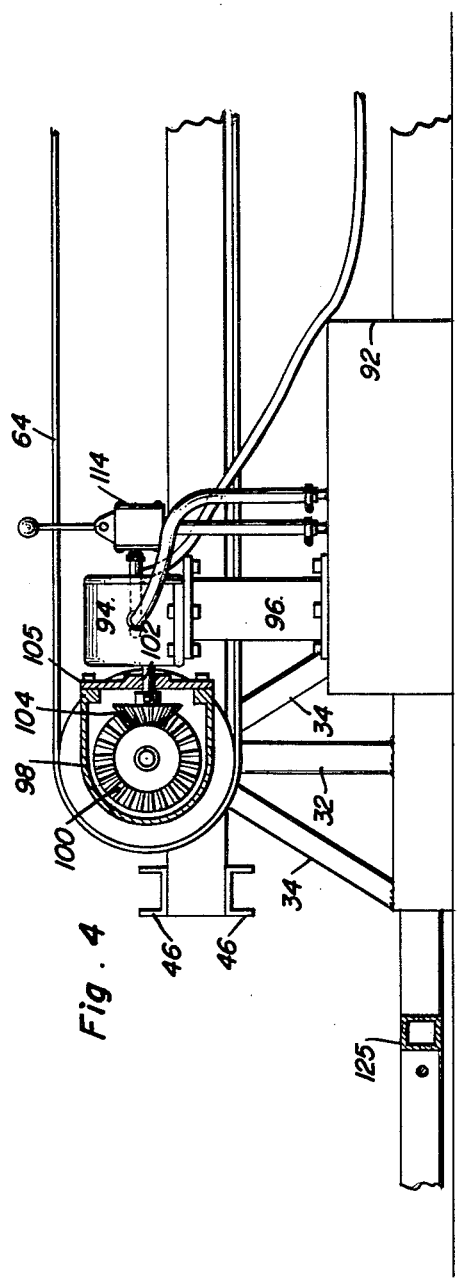
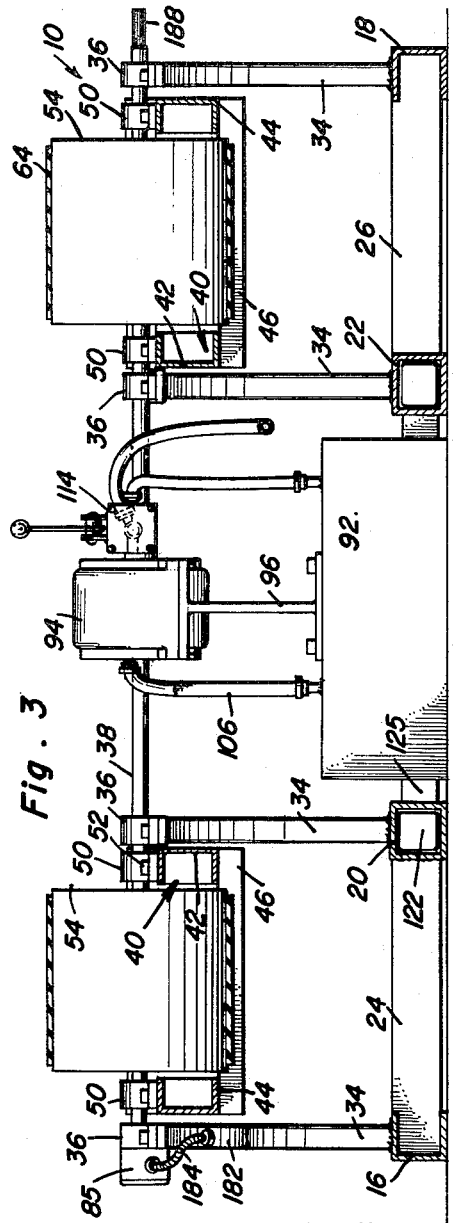
Delmar D. Hundley
INVENTOR.

April 27, 1965
D. D. HUNDLEY
3,180,138
TRACTOR TESTER
Filed May 10, 1962
4 Sheets-Sheet 4
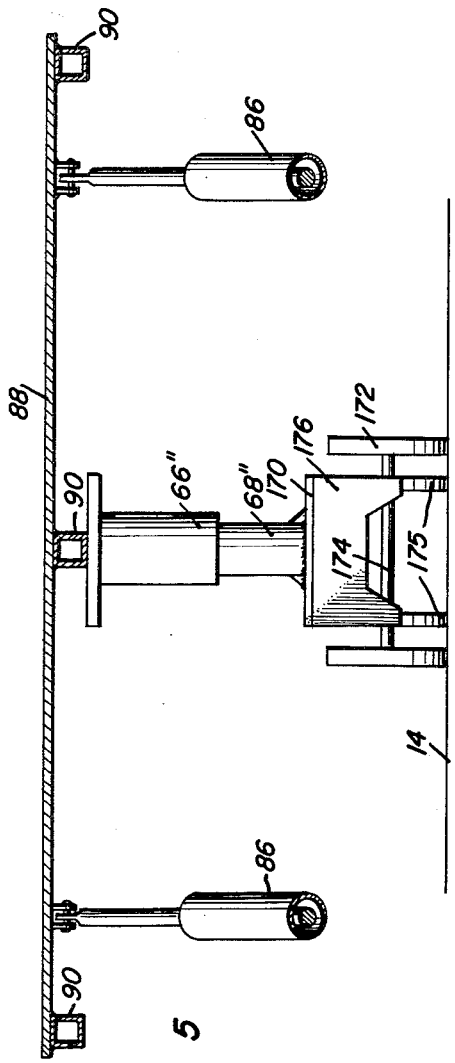
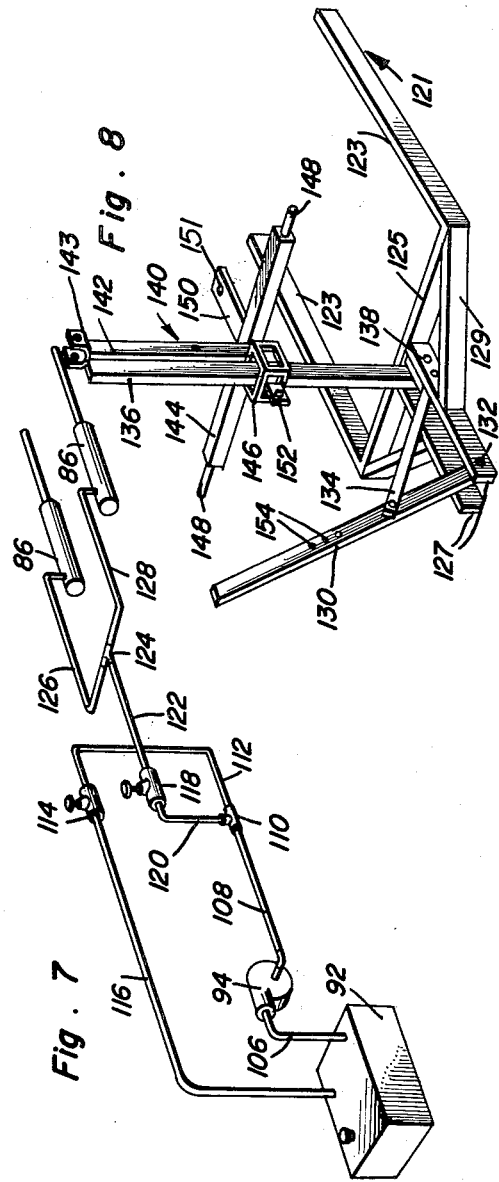
Delmar D. Hundley
INVENTOR.

United States Patent Office 3,180,138
Patented Apr. 27, 1965

3,180,138
TRACTOR TESTER
Delmar D. Hundley, Rte. 3, Clay Center, Kans.
Filed May 10, 1962, Ser. No. 193,813
10 Claims. (Cl. 73—117)

This invention relates to testing devices, and particularly to devices for testing the pulling power and other performance characteristics of any conventional tractor or other powered vehicle.

Accordingly, it is a primary object of the invention to provide a device for checking, testing, diagnosing, examining, or demonstrating the complete performance of any wheel type tractor.

It is another object of the invention to provide a device which will visually indicate the pulling power of conventional tractors.

It is another object of the invention to provide a device for testing tractors, for determining the power of the tractor engines, the hydraulic efficiency of the hydraulic apparatus on the tractors, the speed of the tractors under load, the pulling power of the tractors at various speeds, the weight transfer from the front to the rear wheels during operation of the tractors, the traction slippage of the tractor wheels under full load, the fuel economy of the tractors, and to indicate the maximum and minimum true field performance capabilities and efficiencies of the tractors.

It is yet another object of the invention to provide a device for testing tractors which will be particularly useful for farm implement dealers and service personnel to correctly service and demonstrate all conventional wheel type tractors. The prospective customer by using the testing device will be able to compare all available tractors and thus better select the most efficient tractor or the tractor best suited for his particular needs.

It is yet another object of the invention to provide a tester for tractors provided with power means for tilting or inclining the tractor so as to simulate conditions when the tractor is operated on hills or slopes.

It is another object of the invention to provide a device for testing tractors which may be also used as a power operated ramp for loading tractors onto trailers or other elevated structures.

It is another object of the invention to provide a device for testing the lifting capacity of hydraulically controlled lift arms on tractors.

It is still another object of the invention to provide a tester for tractors which is relatively simple in design, economical to manufacture and maintain, and durable and reliable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the tester with a tractor mounted thereon;

FIGURE 2 is a plan view of the tester without the tractor and with parts broken away;

FIGURE 3 is an enlarged vertical cross-sectional view taken substantially on the plane of line 3—3 in FIGURE 2;

FIGURE 4 is an enlarged cross-sectional view taken substantially on the plane of line 4—4 in FIGURE 3;

FIGURE 5 is an enlarged vertical cross-sectional view taken substantially on the plane of line 5—5 in FIGURE 1;

FIGURE 6 is an enlarged cross-sectional view taken substantially on the plane of line 6—6 in FIGURE 2;

FIGURE 7 is a diagrammatic perspective view of the hydraulic control system for the tester;

FIGURE 8 is a perspective view of a portion of the rear of the tester;

FIGURE 9 is a side elevational view illustrating how the tester is used for testing the lifting capacity of the hydraulic lift arms of a tractor; and FIGURE 10 is a side elevational view of a front portion of the tester.

Referring to the drawings, and particularly to FIGURES 1 through 4, it can be seen that the tester 10 includes a frame 12 of generally rectangular configuration in plan and being substantially flat so as to rest upon a flat supporting surface 14. The frame 12 comprises a pair of parallel side channels 16 and 18 and a pair of elongated box-like hollow members 20 and 22 of rectangular cross section and parallel to and coplanar with the channel members 16 and 18. The ends of the channel members 16 and 20 are connected together by channel members 24 and 26 at the rear end of the frame, and by transverse plates 30 near the forward ends of the longitudinally extending members. The channel members and plates are preferably welded to the longitudinally extending members.

A vertically upwardly extending post 32 is secured to the rear end of each of the side channels 16 and 18 and each of the members 20 and 22. Each post 32 is braced by a pair of diagonal braces 34. The upper end of each post is secured to conventional journal or anti-friction bearing 36. A horizontal drive shaft 38 is rotatably journalled in the four conventional anti-friction bearings 36 supported from the upper ends of the posts 32. Identical track frames 40 are pivotally secured at their rear ends to the shaft 38 and rotatably receive the latter. Each track frame 40 is rectangular in shape and comprises spaced parallel elongated side members 42 and 44 connected together at their ends by transverse channel members 46 and 48 welded thereto. As shown in FIGURE 3, the side members 42 and 44 are channel members of U-shaped cross section. Each track frame 40 is pivotally connected to the shaft 38 by a pair of conventional anti-friction journals 50 which are secured to the side members 42 and 44 by bolts 52.

A cylindrical drive pulley 54 is secured to each end of shaft 38 between side members 42 and 44. A pair of guide pulleys 56 and 58 are also rotatably journalled to each of the track frames 40 by means of short shafts 60 and 62 whose ends are also rotatably connected to the frames by anti-friction journals 50. An endless belt 64 encompasses, in driving relationship, each set of pulleys 54–56–58.

The forward end of each track frame 40 is connected to the upper end of a vertically extending hydraulic cylinder 66 which telescopically receives a hollow hydraulic piston 68 whose lower end is secured to one of the plates 30 of the frame 12. A vertically extending pipe 70 is secured to the forward end of the right side of frame 12 and is connected by a conduit 72 to the inside of hollow piston 68. The upper end of pipe 70 communicates with a conventional Bourdon tube whose free end is connected to a scale indicating hand 74. A circular scale dial 76 is mounted behind the hand 74. The hand 74 rotates as pressure is applied from piston 68 into the Bourdon tube. As shown in FIGURE 2, the left frame 40 is not connected to pipe 70, but instead its forward end is supported on coil springs, not shown. However, if desired it too could be connected to the pipe 70 by means of a hydraulic cylinder as is the right frame 40 illustrated in FIGURE 1.

A post 78 is secured to the forward end of each side of frame 12 and the upper ends of these posts are provided with annular journals 80 which rotatably support a horizontal shaft 82. Shaft 82 is secured to the rear edge of a rectangular ramp 84. A pair of conventional hydraulic motors 86 are pivotally connected at their ends between the forward end of frame 12 and the forward end of ramp 84. Ramp 84 comprises a flat rectangular sheet 88 welded to a U-shaped frame composed of three hollow members 90 of square cross section. A fourth member 90 preferably extends along the underside of the center of the plate 88.

A hydraulic reservoir 92 is provided between the hollow members 20 and 22, and if desired, may be connected thereto by transverse members, not shown. A conventional hydraulic pump 94 is rigidly secured to the top of reservoir 92 by a vertical post 96. The reservoir, post and pump may be connected together by conventional flange and bolt means. A U-shaped gear housing 98 is journalled on shaft 38 and contains a conventional ring gear 100 which is drivingly connected to shaft 38. Pump 94 has a drive shaft 102 secured to a small pinion gear 104 and journalled in a housing end plate 105.

As illustrated in FIGURE 7, the intake of pump 94 is connected to reservoir 92 by a conduit 106. The outlet of pump 94 is also connected to reservoir 92 by conduit 108, T-fitting 110, conduit 112, restrictor valve 114 and conduit 108, T-fitting 110 also is connected to a control valve 118 by a conduit 120. Valve 118 is operatively connected to each of the hydraulic motors 86 by conduit 122, T-fitting 124 and conduits 126 and 128.

As shown in FIGURES 1 and 8, a generally Y-shaped yoke 121 is connected to the rear of frame 12 and comprises a pair of parallel legs 123 telescoped into the rear ends of hollow members 20 and 22 and secured therein in adjusted extended positions by any conventional means (not shown). The rear ends of the legs 123 are connected by a bight 125. A pair of parallel spaced arms 127 are connected to the central portion of the bight 125 and extend rearwardly therefrom. The arms 127 are braced by diagonal braces 129. An upstanding post 130 is pivotally secured at its lower end between and to the rear ends of arms 127 by means of a horizontal pin 132. Post 130 is braced by a diagonal brace 134 whose ends are secured to the post and between the forward ends of the arms 27. An upstanding lever 136 has its lower end pivotally secured between the forward ends of the arms 127 by a pivot pin 138.

A T-connector 140 comprising a stem 142 and a crossbar 144 is slidably connected to lever 136 by a hollow box member 146 which is secured to the T-connector and slidably receives the lever 136. The outer ends of bar 144 are secured to pivot pins 148 and the forward central portion thereof is provided with a forwardly extending tongue 150. The tongue 150 is provided with a vertical bore 151 therethrough. Box member 146 is provided with a rearwardly extending lug 152.

Lever 130 has a spaced row of bores 154 formed therein, and normally a scale 156 of conventional design is connected between lever 130 and T-connector 140 by means of a hook 158 extending through one of the bores 154 and a yoke 160 clamped to lug 152.

When it is desired to use the tester 10 for testing a tractor, valve 118 is opened and ramp 84 is pushed downwardly to the position shown in FIGURE 10. The tractor is then backed up the ramp 84 and onto the belts 64 until its rear wheels 162 are substantially over the pulleys 56. Restrictor valve 114 is opened before the tractor is driven onto the belts thereby permitting the rear wheels 162 to freely rotate the belts which in turn drive pump 94 by means of pulleys 54, shaft 38, gears 100–104 and shaft 102. While pump 94 is rotating, restrictor valve 114 is gradually closed so as to create a pressure in conduits 108 and 112. This pressure then flows through T-fitting 110, valve 18 and conduits 122, 126 and 128 to hydraulic motors 86 for extending these motors so as to operate the ramp to the horizontal position illustrated in FIGURE 1. When the ramp reaches a horizontal position, motors 86 are partly extended and valve 118 is closed to lock the motors in this extended position. A scale 164 is then placed under the forward end of ramp 84. Scale 164 is similar to scale 76 and includes a hand 166 operated by a Bourdon tube so as to rotate about a calibrated dial 168. The scale 164 further includes a platform 170 rotatably supported on wheels 172 connected to the platform by an axle 174 and a strut 176. The front of the platform is supported on legs 175 braced by braces 177. The platform 170 supports a hydraulic motor comprising a cylinder 66' telecopically receiving a piston 68' which is hollow and connected to a vertical pipe 70' by means of a conduit 72'. The pipe is braced by a brace 178 and is connected to the dial 168.

After the tractor is properly positioned on the belts 64, the parallel lower links 180 of its conventional three-point hitch are pivotally connected to the T-connector 140 by means of removable pivot pins 148. The upper end of the stem 140 is secured to a yoke 143 which receives the free end of an upper link 181 of the three point hitch. Link 181 is pivotally connected to yoke 143 by means of a removable pivot pin 145. The forward ends of links 180 and 181 are pivotally connected to the tractor 11 and the links 180 are operated by power operated arms 183 pivotally connected to links 180 by rods 185. The throttle of the tractor is then gradually opened to the desired position, usually wide open, and at the same time restrictor valve 114 is gradually closed so as to place the tractor under load. Since the closing of restrictor valve 114 will cause a back pressure on pump 94, the load applied to the tractor wheels will be directly proportional to the degree of closing of the valve 114. For maximum power testing, the throttle is wide open and the valve 114 is adjusted until the maximum pull is obtained on scale 156. As the scale reading is increased, lever 136 pivots forwardly about its pivot pin 138.

A tachometer 182 of conventional design is mounted on one of the braces 34 and drivingly connected to shaft 38 by a flexible cable 184 and a gear transmission 85. Thus, the pulling power of any tractor can be tested and compared at any speed and at any throttle setting.

As lever 136 pivots forwardly during testing, the box member 146 will slide on the lever so as to maintain the scale in proper alignment with the hitch of the tractor. By comparing the tachometer 182 to the speedometer reading of the tractor or alternatively to a second tachometer, not shown, connected to the tractor axle the degree of slippage between the wheels 162 and belts 64 may be determined under load. The friction coefficient of belt 164 will be such as to simulate normal operating conditions of the tractor.

When the tractor is being tested, the front wheels 186 thereof will tend to rise and this will cause a change in readings of the scales 163 and 164. These scales therefore indicate the shifting of the weight of the tractor to and from the front and rear wheels during various operating conditions.

During operation, the motors 86 may be further extended so as to tilt the ramp 84 upwardly above the position shown in FIGURE 1 so as to test the tractor under conditions to which it would be subjected when operating on an incline. Also, by operating the ramp 84 to a higher elevation by controlling the valves 114 and 118, the ramp 84 may be adjusted to a proper elevation for loading the tractor onto trailers and other elevated structures.

As shown in FIGURE 3, one end of shaft 38 is splined at 188 for connecting a flexible cable 190 in driving relationship thereto. As shown in FIGURE 2, the flexible cable 190 is operatively connected to the power take-off shaft 192 of the tractor 11. Thus, by disconnecting the wheels of the tractor from its engine by means of the clutch or transmission, and operating the power take-off shaft 192 as illustrated in FIGURE 2, the power produced by the power take-off shaft may be tested by closing restrictor valve 114 until the engine is reduced to a specific r.p.m. Another tractor may be tested without changing the valve 114 to see if its power take-off can produce the same power. Alternatively, a pressure gauge may be connected to conduit 108 to test the power produced by the power take-off shafts of various tractors. Although the tractor 11 is shown in FIGURE 2 as being mounted on the tester, normally, for just testing the power take-off of any tractor, the tractor would not be mounted on the tester, but to one side thereof.

FIGURE 9 illustrates how the invention could be used for testing the lifting power of the hydraulic or power operated lift mechanism of a tractor. For this test, hook 158 is disconnected from bores 154, scale 156 is moved to a vertical position and hook 158 connected to one of the pins 193 extending between arms 127. When the power operated links 180 are operated upwardly, box member 146 will slide upwardly on lever 136 and operate scale 156 to indicate the maximum lifting power of the power operated lift mechanism.

The forward ends of members 16, 18, 20 and 22 are provided with arcuate plates 194 so that these members may serve as skids and the entire testing device may be moved around as a sled. The tongue 150 may be used to connect the tractor to the tester by means of a single draw bar.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A device for testing a tractor comprising a base including front and rear ends, treadmill means mounted on said base for movement of at least one portion thereof between upper and lower positions and adapted to support and to be driven by the rear drive wheels of a tractor, first scale means operatively connected to said movable portion and said base for indicating the weight of said drive wheels plus the portion of the weight of the tractor supported thereby, adjustable braking means operatively connected to said treadmill means to apply a preselected braking torque thereto including second scale means operative to measure the amount of torque absorbed by said braking means, said base including means defining first upper rear anchor means and second lower anchor means disposed forwardly of said rear anchor means, elongated tension member means having one end adapted to be secured to the rear end of a tractor lift hitch and a second end selectively securable to said first and second anchor means, said tension member means including third scale means operative to measure the amount of tension applied to said tension member means.

2. The combination of claim 1 including auxiliary input drive means operatively drivingly connected to said treadmill means and including a flexible input shaft adapted for driven connection with the power take-off output shaft of said tractor.

3. The combination of claim 1 including table means, said table means including a portion thereof which is vertically adjustable and adapted to support the front wheels of said tractor at various elevations relative to said rear wheels of said tractor, said table means having fourth scale means operatively connected thereto for indicating the weight of said front wheels and the portion of the weight of said tractor supported thereby.

4. The combination of claim 1 including auxiliary input drive means operatively drivingly connected to said treadmill means and including a flexible input shaft adapted for driven connection with the power take-off output shaft of said tractor, said auxiliary input drive including tachometer means operatively connected thereto and adapted to indicate the speed of rotation of said power take-off output shaft.

5. The combination of claim 1 including table means, said table means including a portion thereof which is vertically adjustable and adapted to support the front wheels of said tractor at various elevations relative to said rear wheels of said tractor, said table means having fourth scale means operatively connected thereto for indicating the weight of said front wheels and the portion of the weight of said tractor supported thereby, said table means comprising an elongated table member pivotally secured at its rear end to the forward end portion of said frame for rotation about a generally horizontal axis extending transversely of said frame, said portion of said table means comprising the free swinging forward end portion of said table member.

6. The combination of claim 5 including extendable fluid motor means operatively connected between said frame and the free end portion of said table member for raising and lowering said free end portion to vary the front to rear inclination of said tractor.

7. The combination of claim 6 wherein said braking means comprises a fluid pump having a valved discharge, and means for selectively communicating said fluid pump discharge with said fluid motor means for actuating the latter.

8. The combination of claim 1 wherein said braking means comprises a fluid pump having a valved discharge.

9. The combination of claim 1 wherein said first anchor means includes means for selectively varying the elevation of the point of connection of said second end of said elongated tension member means with said first anchor means.

10. The combination of claim 1 wherein said second anchor means includes means for selectively varying the front to rear positioning of the point of connection of said second end of said elongated tension member means with said second anchor means.

References Cited by the Examiner

UNITED STATES PATENTS

| 1,525,447 | 2/25 | Hose | 73—117 X |
| 1,650,504 | 11/27 | Frost | 73—117 |
| 2,754,107 | 7/56 | Ernst et al. | 177—211 |
| 2,979,942 | 4/61 | Allen | 73—117 |

FOREIGN PATENTS

| 620,703 | 1/27 | France. |
| 1,180,189 | 12/58 | France. |

RICHARD C. QUEISSER, *Primary Examiner.*